(12) United States Patent
Schueler et al.

(10) Patent No.: US 10,424,193 B1
(45) Date of Patent: Sep. 24, 2019

(54) LOCKING MECHANISMS FOR ENABLING OR DISABLING THE OPERATIONS OF TRAINABLE TRANSCEIVERS

(71) Applicant: GENTEX CORPORATION, Zeeland, MI (US)

(72) Inventors: Kevin A. Schueler, Grand Haven, MI (US); Steven L. Geerlings, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/949,100

(22) Filed: Apr. 10, 2018

(51) Int. Cl.
  *G08C 17/02* (2006.01)
  *H04B 1/38* (2015.01)

(52) U.S. Cl.
  CPC ............... *G08C 17/02* (2013.01); *H04B 1/38* (2013.01); *G08C 2201/60* (2013.01)

(58) Field of Classification Search
  CPC .... A61G 7/05; A61G 7/0506; A61G 2203/12; A61G 7/018; A61G 7/015; A61G 7/0507; A61G 7/0573; A61G 7/05769; A61G 7/05776; A61G 12/00; A61G 2203/46
  USPC ........................................................ 340/4.34
  See application file for complete search history.

(56) References Cited

U.S. PATENT DOCUMENTS

| | | | | |
|---|---|---|---|---|
| 5,619,190 A * | 4/1997 | Duckworth | ............. | B60R 1/088 340/5.25 |
| 5,903,226 A * | 5/1999 | Suman | ............... | G07C 9/00182 340/12.28 |
| 6,466,781 B1 | 10/2002 | Bromba et al. | | |
| 6,980,092 B2 * | 12/2005 | Turnbull | .................... | B60R 1/12 307/10.1 |
| 7,084,781 B2 * | 8/2006 | Chuey | ..................... | G08C 17/02 340/12.23 |
| 7,161,466 B2 * | 1/2007 | Chuey | ..................... | G08C 17/02 340/5.26 |
| 7,692,533 B2 * | 4/2010 | Chiba | ................... | B60R 25/104 340/426.1 |
| 7,839,263 B2 | 11/2010 | Shearer | | |
| 8,253,528 B2 * | 8/2012 | Blaker | ..................... | B60R 25/24 340/5.22 |

(Continued)

OTHER PUBLICATIONS

International Search Report dated Oct. 4, 2018, for corresponding PCT application No. PCT/US2018/026781, 2 pages.

*Primary Examiner* — Mark S Blouin
(74) *Attorney, Agent, or Firm* — Price Heneveld LLP; Bradley D. Johnson

(57) ABSTRACT

The present disclosure is directed to systems and methods of enabling and disabling a functionality of a trainable transceiver. The trainable transceiver may include a plurality of buttons, a control circuit, and a locking mechanism. The plurality of buttons may cause the control circuit to control one or more functions of a remote device. The control circuit may compare a sequence of inputs on the plurality of buttons to a predetermined sequence. The control circuit may acquire a sensor reading and compare the sensor reading to predetermined data. The locking mechanism may enable or disable operation of the control circuit in controlling the one or more functions of the remote device, responsive to a determination that the sequence of inputs matches the predetermined sequence and the sensor reading matches the predetermined data.

20 Claims, 4 Drawing Sheets

(56) References Cited

U.S. PATENT DOCUMENTS

| | | | |
|---|---|---|---|
| 2005/0046545 A1* | 3/2005 | Skekloff ................. | B60R 25/24 340/5.61 |
| 2007/0152798 A1* | 7/2007 | Witkowski ............. | G08C 17/02 340/5.26 |
| 2009/0315672 A1* | 12/2009 | Nantz .................... | G08C 17/02 340/5.26 |
| 2010/0171588 A1 | 7/2010 | Chutorash et al. | |
| 2011/0043328 A1* | 2/2011 | Bassali .............. | G07C 9/00182 340/5.71 |
| 2016/0104374 A1 | 4/2016 | Ypma et al. | |

* cited by examiner

LOCKING MECHANISMS FOR ENABLING OR DISABLING THE OPERATIONS OF TRAINABLE TRANSCEIVERS

CROSS-REFERENCE TO RELATED APPLICATION

This application claims the benefit of and priority to U.S. Provisional Patent Application No. 62/487,438, filed on Apr. 19, 2017, entitled LOCKING MECHANISMS FOR ENABLING OR DISABLING THE OPERATIONS OF TRAINABLE TRANSCEIVERS, the entire disclosure of which is hereby incorporated herein by reference.

TECHNICAL FIELD

The present invention relates generally to the field of transceivers for controlling remote electronic devices.

BACKGROUND

A transceiver may transmit various signals to control one of the functions of a remote electronic device (e.g., a garage door opener). The transceiver may have buttons, each of which may trigger the transmission of a command signal to actuate one function at the remote electronic device. Such transceivers and the remote electronic devices that these transceivers may control may have security vulnerabilities, especially when a malicious entity obtains access to the transceiver either remotely or physically.

SUMMARY

At least one aspect of the present disclosure relates to a trainable transceiver for controlling remote devices. The trainable transceiver may include a plurality of buttons. The plurality of buttons may cause a control circuit to control one or more functions of a remote device. The trainable transceiver may include an input authenticator module executed on the control circuit. The input authenticator module may compare a sequence of inputs on the plurality of buttons to a predetermined sequence. The trainable transceiver may include a locking mechanism. The locking mechanism may enable or disable operation of the control circuit to control the one or more functions of the remote device, responsive to a determination that the sequence of inputs on the plurality of buttons matches the predetermined sequence.

In some embodiments, the trainable transceiver may include a sensor validator module executed on the control circuit. The sensor validator module may identify a sensor reading acquired by a sensor and compare the sensor reading to a predetermined data. In some embodiments, the locking mechanism may enable or disable the operation of the control circuit, responsive to a determination that the sensor reading substantially matches the predetermined data and to the determination the sequence of inputs on the plurality of buttons matches the predetermined sequence. In some embodiments, the sensor validator may use at least one of an image recognition algorithm on an image captured at the sensor or a signal comparison algorithm on a radiofrequency signal taken at the sensor.

In some embodiments, the input authenticator module may determine that a time elapsed between a first time for a first input of the sequence of inputs and a second time of a second input of the sequence of inputs is within a predefined time window. In some embodiments, the input authenticator module may compare, responsive to the determination that the time elapsed between the first time and the second time is within the predefined time window, the second input of the sequence of inputs to a specified input in the predetermined sequence. In some embodiments, the input authenticator module may compare the sequence of inputs from the plurality of buttons and determine whether it matches one of a lock sequence or an unlock sequence.

In some embodiments, the locking mechanism may preserve or erase training information from memory of the control circuit to control the one or more functions of the remote device based on the determination that the sequence of inputs on the plurality of buttons matches the predetermined sequence. In some embodiments, the locking mechanism may include a mechanical switch. The mechanism switch may enable or disable the operation of a transceiver of the control circuit for transmitting control signals to control the one or more functions of the remote device based on the determination that the sequence of inputs on the plurality of buttons matches the predetermined sequence.

At least one aspect of the present disclosure relates to a system for controlling remote devices. The system may include a plurality of buttons. The plurality of buttons may receive a plurality of inputs and may cause a control circuit of a trainable transceiver to control one or more functions of a remote device using training information. The system may include a sensor coupled to the control circuit. The sensor may acquire sensor data and may relay the sensor data to the control circuit. The system may include a locking mechanism. The locking mechanism may enable or disable operation of the control circuit in response to the plurality of inputs matching a predetermined sequence and the acquired sensor data substantially matching predetermined data.

In some embodiments, the sensor may acquire the sensor data in response to the plurality of inputs at the plurality of buttons matching the predetermined sequence. In some embodiments, the locking mechanism may cause a user interface element to display a status of the trainable transceiver in response to the plurality of inputs matching the predetermined sequence and the acquired sensor data substantially matching predetermined data. In some embodiments, the locking mechanism may enable or disable the operation of the control circuit, in response to the plurality of inputs on a subset of the plurality of buttons matching the predetermined sequence. In some embodiments, the locking mechanism may maintain or delete the training information from the control circuit, responsive to the plurality of inputs matching the predetermined sequence and the acquired sensor data substantially matching the predetermined data. In some embodiments, the locking mechanism may connect a power source to a transceiver circuit of the control circuit to enable transmission of a control signal to the remote device or to disconnect the power source from the transceiver of the control circuit to disable the transmission of the control signal to the remote device, responsive to the plurality of inputs matching the predetermined sequence and the acquired sensor data substantially matching the predetermined data.

At least one aspect of the present disclosure relates to a method of controlling remote devices. A trainable transceiver may receive a sequence of inputs on a plurality of buttons. The trainable transceiver may compare the sequence of inputs received from the plurality of buttons to a predetermined sequence. The trainable transceiver may set, responsive to determining that the sequence of inputs on the plurality of buttons matches the predetermined sequence, an operation mode of the trainable transceiver to enabled or disabled for controlling one or more functions of a remote device.

In some embodiments, the trainable transceiver may acquire, via a sensor, a sensor reading. In some embodiments, the trainable transceiver may compare the sensor reading to predetermined data. In some embodiments, the trainable transceiver may set the operation mode to enabled or disabled, responsive to determining that the sensor reading substantially matches the predetermined data.

In some embodiments, the trainable transceiver may identify, responsive to receiving an input of the sequence of inputs, the operation mode of the trainable transceiver. In some embodiments, the trainable transceiver may compare the sequence of inputs on the plurality of buttons to one of a lock sequence or an unlock sequence based on identifying the operation mode of the trainable transceiver.

In some embodiments, the trainable transceiver may determine that a time elapsed between a first time for a first input of the sequence of inputs and a second time of a second input of the sequence of inputs is within a predefined time window. In some embodiments, the trainable transceiver may compare, responsive to determining that the time elapsed between the first time and the second time is within the predefined time window, the second input of the sequence of inputs to a specified input in the predetermined sequence. In some embodiments, the trainable transceiver may display, on a user interface element, the operation mode of the trainable transceiver, responsive to setting the operation mode to enabled or disabled.

In some embodiments, the trainable transceiver may erase, responsive to determining that the sequence of inputs on the plurality of buttons matches the predetermined sequence, training information from memory of the trainable transceiver for controlling the one or more functions of the remote device. In some embodiments, the trainable transceiver may set, using a mechanical switch connected to a power supply coupled to the trainable transceiver, the operation mode of the trainable transceiver.

Alternative embodiments relate to other features and combinations of features as may be generally recited in the claims.

DETAILED DESCRIPTION

Figure 1:
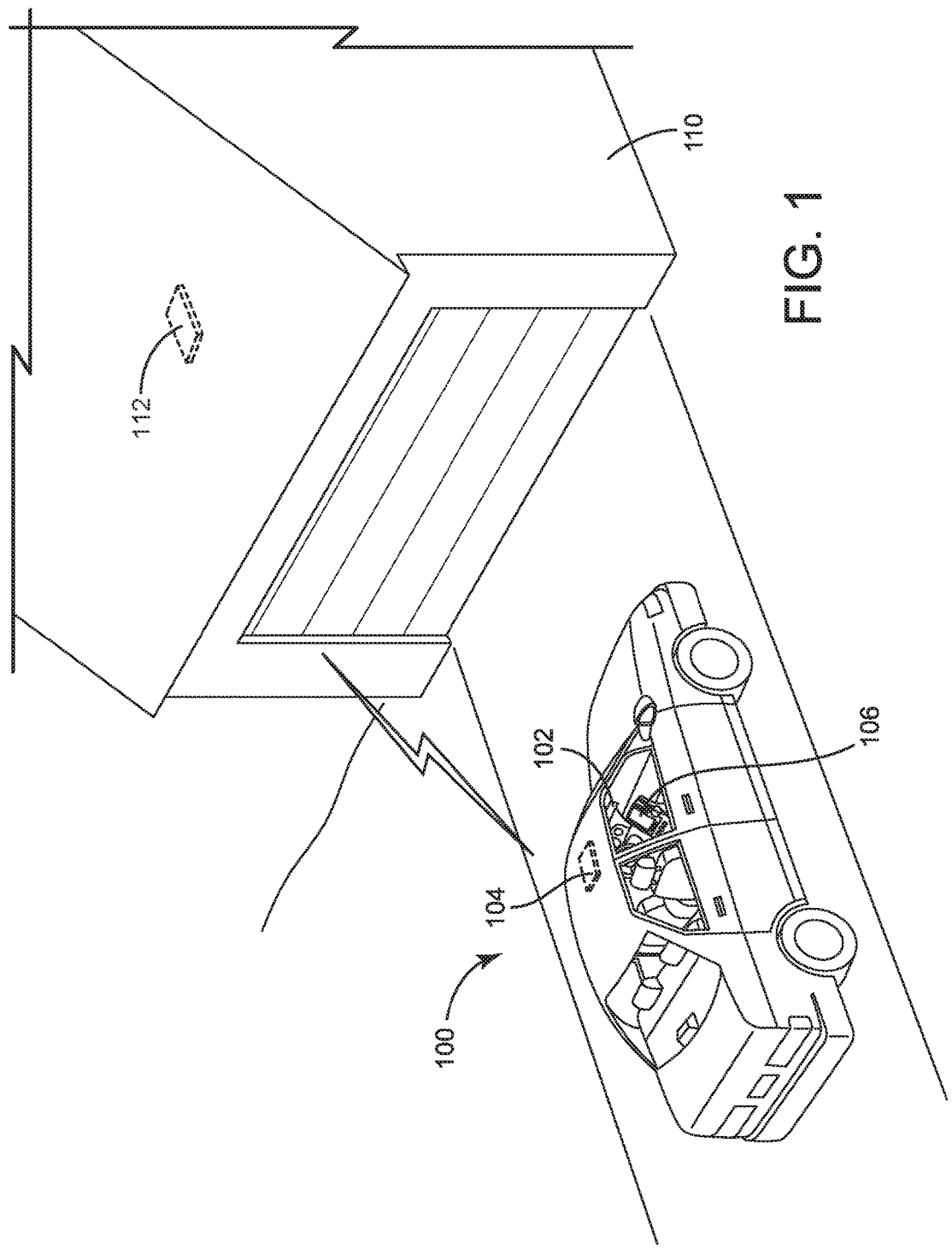
FIG. 1 is a perspective view of an embodiment of a vehicle having a trainable transceiver for operating a garage door.

Referring generally to the FIGURES, systems, apparatuses, and methods are shown and described for allowing a trainable transceiver to train and control multiple commands to a single channel. A trainable transceiver may transmit various signals to control or actuate one of the functions at a remote electronic device (e.g., opening or closing a door). This disclosure allows for the operations of the trainable transceiver to be enabled or disabled by a locking mechanism upon executing multi-factor authentication. In some embodiments, the locking mechanism may enable or disable the operations of the trainable transceiver by performing two-factor authentication. In the first authentication step, the trainable transceiver may compare a sequence of inputs on the buttons to a lock or unlock sequence. In the second authentication step, the trainable transceiver may compare a sensor acquired data (e.g., image, radiofrequency signal, etc.) to a validation dataset. If both the sequence of inputs matches the lock or unlock sequence and the sensor acquired data matches the validation dataset, the locking mechanism may be triggered to enable or disable the operations of the trainable transceiver.

With respect to trainable transceivers for controlling home electronic devices and/or remote devices in general, home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look ahead codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

The trainable transceiver may transmit and/or may receive information (e.g., activation signals, control signals, control data, status information, or other information) using a radio frequency signal. For example, the transceiver may transmit and/or receive radio frequency signals in the ultra-high frequency range, typically between 260 and 960 megahertz (MHz), although other frequencies may be used. In other embodiments, a trainable transceiver may include additional hardware for transmitting and/or receiving signals (e.g., activation signals and/or signals for transmitting and/or receiving other information). In some embodiments, a trainable transceiver may include a light sensor and/or light emitting element, a microphone and/or speaker, a cellular transceiver, an infrared transceiver, or another communication device.

The trainable transceiver may be trained by a user to work with particular remote devices and/or home electronic devices (e.g., a garage door opener). In some embodiments, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and detect the control information of the received signal. In some embodiments, an original transmitter is a transmitter produced by the manufacturer of home electronic devices, remote devices, or other devices for use specifically with the corresponding device. An original transmitter may be a transmitter which is sold separately from a home electronic device, remote device, or other device but is intended to work with that device. The original transmitter may be a transmitter or transceiver that is part of a retrofit kit to add functions to an existing home electronic device, remote device, or other device. An original transmitter may be a transmitter or transceiver that is not manufactured by or under license from the manufacturer or owner of a home electronic device, remote device, or other device.

Referring to FIG. 1, a perspective view of a vehicle 100 and garage 110 is shown, according to an exemplary embodiment. Vehicle 100 may be an automobile, truck, sport vehicle, or other vehicle. Vehicle 100 is shown to include a trainable transceiver unit 102. In some embodiments, trainable transceiver unit 102 may be integrated with a mirror assembly (e.g., a rear view mirror assembly) of vehicle 100. In other embodiments, trainable transceiver unit 102 may be mounted to other vehicle interior elements, such as a vehicle headliner 104, a center stack 106, a visor, an instrument panel, or other control unit within vehicle 100.

Trainable transceiver unit 102 is configured to communicate with a remote electronic system 112 of a garage 110 or other structure. In some embodiments, remote electronic system 112 is configured to control operation of a garage door attached to garage 110. In other embodiments, remote electronic system 112 may be a home lighting system, a home security system, a data network (e.g., using ASK, using OOK, using FSK, LAN, WAN, cellular, etc.), a HVAC system, or any other remote electronic system capable of receiving control signals from trainable transceiver unit 102.

Figure 2:
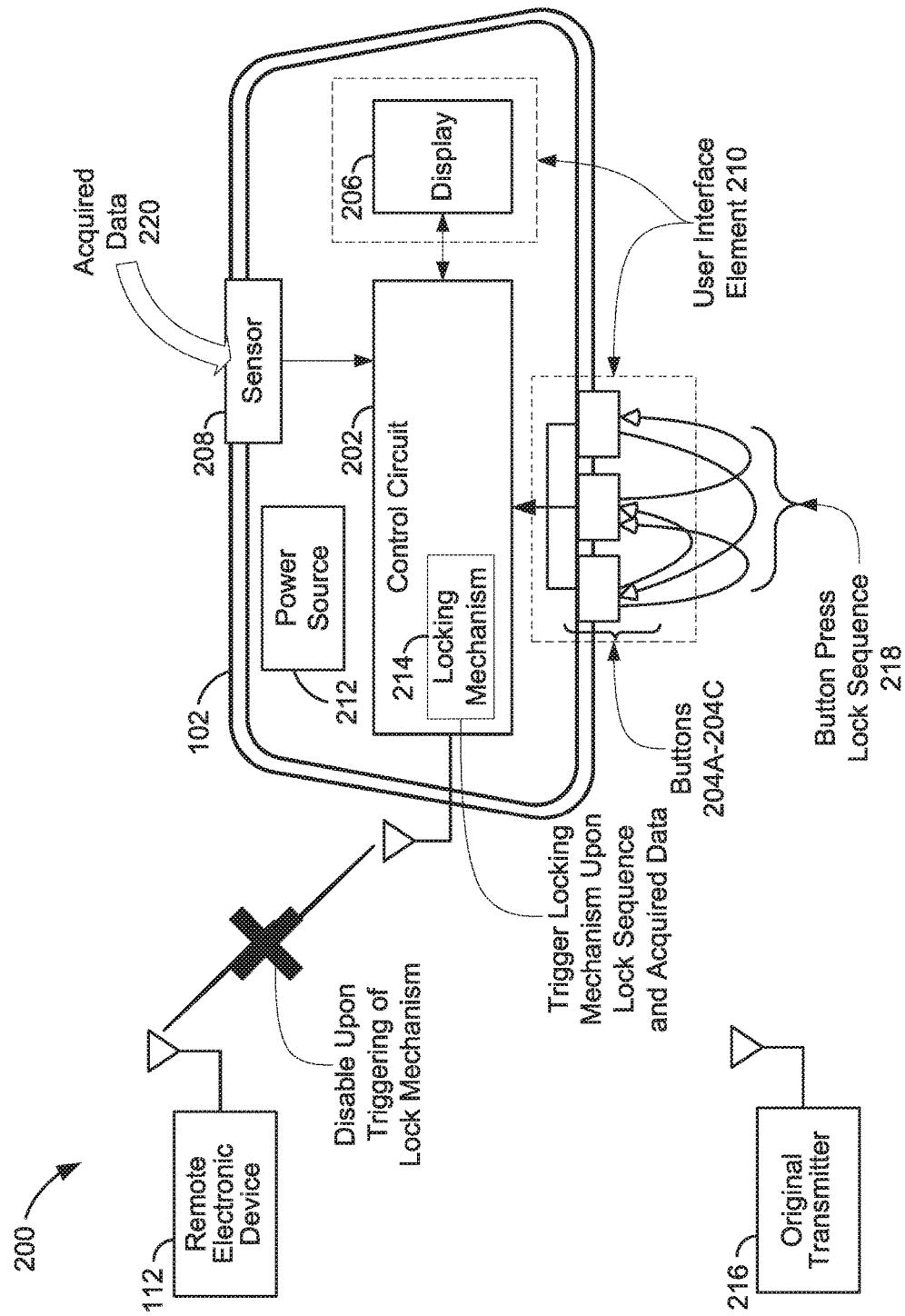
FIG. 2 is a block diagram of a trainable transceiver with a locking mechanism disabling one functionality of the trainable transceiver.

Now referring to FIG. 2, depicted is a block diagram of a system 200 for the trainable transceiver 102 with a locking mechanism 214 disabling one functionality of the trainable transceiver 102. The environment 200 may include the trainable transceiver 102, the remote electronic device 112, and an original transmitter 216. The trainable transceiver 102 may be part of a housing, such as a perimeter frame, rear housing, or other boundary associated with a rear view mirror assembly. In some embodiments, the components of the trainable transceiver 102 may be located within or mounted upon the housing. In some embodiments, some components of the trainable transceiver 102 may be located within or mounted upon the housing, while other components of the trainable transceiver 102 may be located without. The trainable transceiver 102 may include a control circuit 202, three buttons 204A-204C, a display 206, a sensor 208, and a power source 212. In some embodiments, the locking mechanism 214 may be part of the control circuit 202 as depicted. In some embodiments, the locking mechanism 214 may be separate from but coupled to the control circuit 202. The three buttons 204A-204C and the display 206 may form part of a user interface element 210.

To trigger the locking mechanism 214 in enabling or disabling the functionality of the trainable transceiver 102, a user of the trainable transceiver 102 may first enter a sequence of button presses 218 on the three buttons 204A-204C at the user interface element 210 as the initial step in two-factor authentication. The control circuit 202 may determine that the sequence of button presses 218 matches a lock sequence. At this time, the control circuit 202 may cause the sensor 208 to acquire sensor data 220 to complete two-factor authentication. The sensor 208 may be one of a camera (e.g., visible, infrared, ultraviolet, etc.), microphone, and a radio-frequency (RF) detector (e.g., near-field communication (NFC) detector), among others. The control circuit 202 may then compare the acquired sensor data 220 from the sensor 208 with validation data. The validation data may correspond to previously read data from the user (e.g., an image of an iris, an image of a face, a RF signal frequency, etc.) to perform the two-factor authentication. If the acquired sensor data 220 substantially matches the validation data (e.g., 75%-100%), the control circuit 202 may cause the locking mechanism 214 to disable one or more functionalities of the trainable transceiver 102. In some embodiments, the locking mechanism 214 may prevent transmission of a control signal from the trainable transceiver 102 to the remote electronic device 112 to actuate one or more functions thereon.

Figure 3:
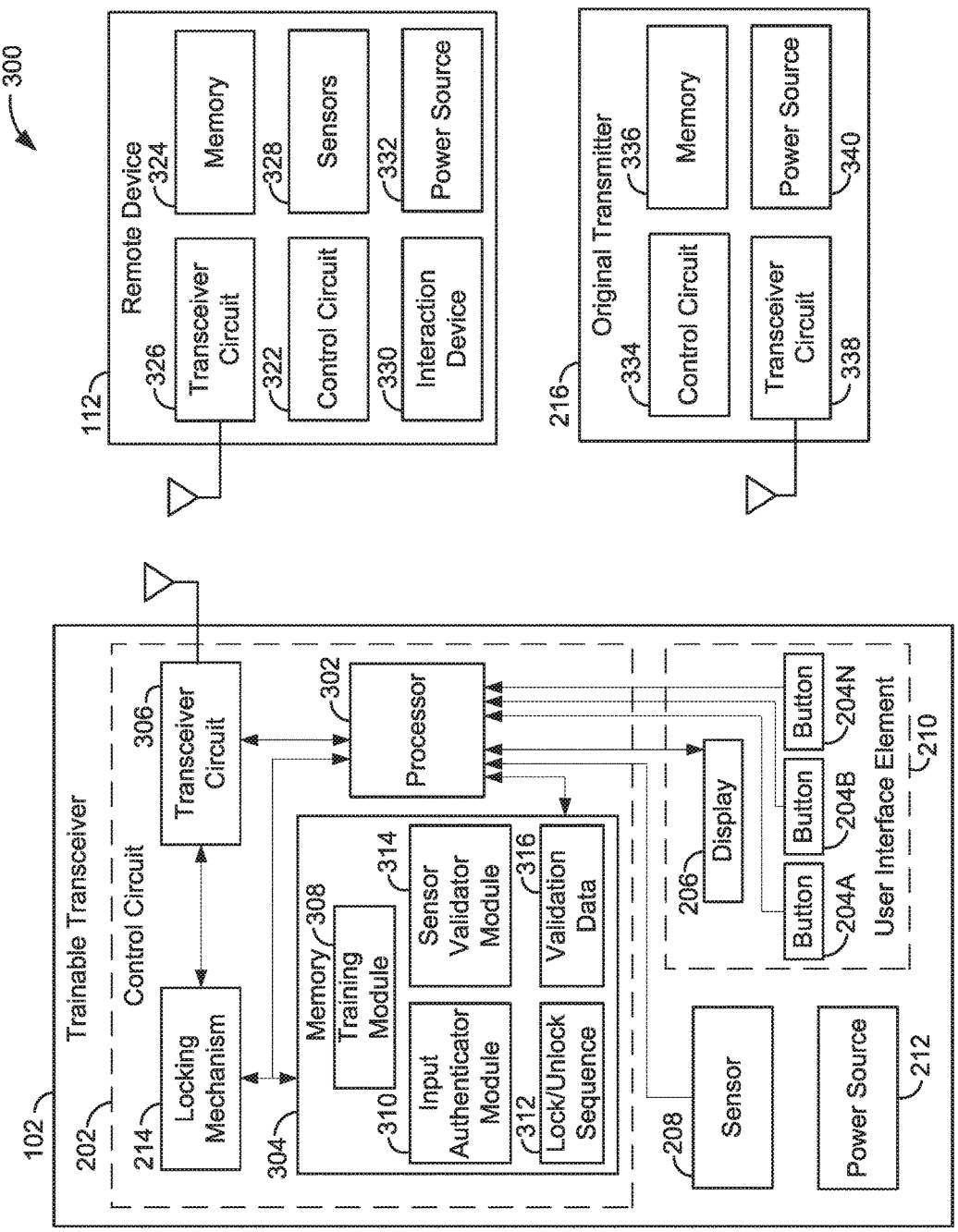
FIG. 3 is a schematic diagram of a trainable transceiver and the external devices with which the trainable transceiver can communicate.

Now referring to FIG. 3, depicted is a schematic diagram 300 of a trainable transceiver 102 and the external devices (e.g., a remote device 112 and an original transmitter 216, among others) with which the trainable transceiver 102 can communicate. In brief overview, the trainable transceiver 102 may include the control circuit 202 with a processor 302, memory 304, and a transceiver circuit 306, the sensor 208, the user interface element 210 with one or more buttons 204A-204N and the display 206, the power source 212, and the locking mechanism 214, among other components. The remote device 112 may include a control circuit 322, memory 324, a transceiver circuit 326 for transmitting and receiving signals, sensors 328 to monitor itself, the environment, hardware, an interaction device 330 to interact with another device, and a power source 332 for powering the components. The original transmitter 216 may include a control circuit 334, memory 336, a transceiver circuit 338 for transmitting and receiving signals, and a power source 340 for powering components.

The control circuit 202 of the trainable transceiver 102 may be configured to receive inputs from the user interface 210. In response to inputs from the user interface 210, the control circuit 202 may cause the transceiver circuit 306 to transmit an activation signal, control signal, and/or other signal. The control circuit 202 may use information in memory 304 in order to cause the transceiver circuit 306 to format a signal for reception by a particular home electronic device or remote device 112. In some embodiments, the memory 304 may include an identifier of the device, encryption information, frequencies for use in transmitting to the device, and/or other information.

The control circuit 202 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 202 may be a system on a chip (SoC) individually or with additional hardware components described herein. The control circuit 202 may further include, in some embodiments, memory 304 (e.g., random access memory, read only memory, flash memory, hard disk storage, flash memory storage, solid state drive memory, etc.). In further embodiments, the control circuit 202 may function as a controller for one or more hardware components included in the trainable transceiver. In some embodiments, the control circuit 202 may function as a controller for a machine-human interface (e.g., user interface 210) or other operator input device, a controller for a transceiver, transmitter, receiver, or other communication device (e.g., implement a Bluetooth communications protocol).

The control circuit 202 may be coupled to memory 304. The memory 304 may be used to facilitate the functions of the trainable transceiver 102 described herein. Memory 304 may be volatile and/or non-volatile memory. The memory 304 may be random access memory, read only memory, flash memory, hard disk storage, flash memory storage, solid state drive memory, etc. In some embodiments, the control circuit 202 may read and write to memory 304. Memory 304 may include computer code modules, data, computer instructions, or other information which may be executed by the control circuit or otherwise facilitate the functions of the trainable transceiver described herein. The memory 304 may include encryption codes, pairing information, identification information, a device registry, etc. Memory 304 may include computer instructions, codes, programs, functions, data sets, and/or other information which are used to implement the algorithms described herein.

The user interface 210 may include a series of buttons and an illuminable logo, design, light, or other feature. Each button may be trained to operate a different home electronic device and/or remote device 112 using one or more of the training procedures described herein. In some embodiments, each button may be a physical mechanical button configured to trigger the control circuit 202 to control the remote device 112 upon a press or other interaction with the button. In some embodiments, each button may be a soft key on an electronic display configured to trigger the control circuit 202 to control the remote device 112 upon interaction with the soft key. The illuminable feature of the user interface 210 may be used to communicate information to the user of the trainable transceiver 102. The user interface 210 may include a display, one or more LEDs, a speaker, and/or other output devices for providing an output to a vehicle occupant. The output may convey information to the vehicle occupant regarding the position of the vehicle within a garage, structure, and/or designated parking area. In some embodiments, the user interface element 210 may include a reconfigurable electronic display that may be touch-sensitive.

The user interface 210 may be located remotely from one or more other components of the trainable transceiver 102 in some embodiments. In embodiments in which the trainable transceiver 102 is installed in or otherwise integrated with a vehicle, the user interface 210 may be located within the cabin of the vehicle, and one or more other components of the trainable transceiver 102 may be located in other locations (e.g., in an engine bay, in a trunk, behind or within a dashboard, in a headliner, elsewhere in the cabin, and/or in other locations). This may allow for installation of the trainable transceiver 102, including the antenna, in a variety of locations and/or orientations. This may allow for the antenna(e) of the trainable transceiver 102 to be installed, mounted, or otherwise located in or on the vehicle in a position with less interference from vehicle structural components.

The user interface 210 and other components of the trainable transceiver 102 may be in unidirectional or bidirectional communication with each other. The user interface 210 may communicate via wire or wirelessly with the remaining components of the trainable transceiver 102 in some embodiments. In some embodiments, the user interface 210 may be connected via a wire with the remaining components of the trainable transceiver 102. In some embodiments, the user interface 210 may include a transceiver for transmitting signals corresponding to inputs received and for receiving status or other information to be conveyed to a vehicle occupant. The user interface 210 may include a wireless transceiver (e.g., WiFi transceiver, Bluetooth transceiver, optical transceiver, and/or other transceiver) configured to communicate with the other components using the transceiver circuit 306 and/or a second transceiver (e.g., WiFi transceiver, Bluetooth transceiver, optical transceiver, and/or other transceiver) located with the other components remote from the operator input device. Communication between the trainable transceiver 102 and the operator input device may be carried out using one or more wireless communication protocols (e.g., a Bluetooth protocol, WiFi protocol, ZigBee protocol, or other protocol). The other components of the trainable transceiver 102 may communicate with the operator input device using the transceiver circuit 306 and/or a secondary or other transceiver (e.g., a Bluetooth transceiver).

The sensor 208 of the trainable transceiver may include a camera (e.g., visible, infrared, ultraviolet, etc.), a microphone, a fingerprint reader, and a radiofrequency (RF) detector (e.g., near-field communication (NFC) detector), among others. Data 220 acquired by the sensor 208 may be relayed to the control circuit 202 for additional processing. In some embodiments, the data 220 acquired by the sensor 208 may be used to monitor a status and other information of the trainable transceiver 102 itself. In some embodiments, the data 220 acquired by the sensor 208 may be used by the control circuit 202 to perform multi-factor authentication. Additional details regarding the functionality of the sensor 208 and the use of the data 220 acquired by the sensor 208 are detailed herein below.

The power source 212 may also be included in the trainable transceiver 102 in some embodiments. The control circuit 202 may control the power source 212 such that the antenna and/or transceiver circuit 306 is provided with an amount of power determined based on the orientation of the trainable transceiver 102. In one embodiment, the power source 212 may be or may include a vehicle power system. The power source may be a vehicle power system including a battery, alternator or generator, power regulating equipment, and/or other electrical power equipment. In further embodiments, the power source 212 may include components such as a battery, capacitor, solar cell, and/or other power generation or storage equipment.

The trainable transceiver 102 may be trained to an existing original transmitter 216 such that the trainable transceiver 102 controls the device associated with the original transmitter 216. For example, a user may place the trainable transceiver 102 and original transmitter 216 such that the trainable transceiver 102 is within the transmission range of the original transmitter 216. The user may then cause the original transmitter 216 to send an activation signal or other transmission (e.g., by depressing a button on the original transmitter 216). The trainable transceiver 102 may identify one or more activation signal parameters, the device, and/or other information based on the transmission from the original transmitter 216 which the trainable transceiver 102 may receive using the transceiver circuit 306. The control circuit, memory, and/or other transceiver circuit 306 may identify, determine, and/or store information such as the frequency, frequencies, or channels used by the original transmitter 216 and therefore the device associated with the original transmitter 216, a control code or other encryption information, carrier frequency, bandwidth, and/or other information.

In some embodiments, the remote device 112, or other device may be configured to learn an identifier, encryption information, and/or other information from a trainable transceiver 102. For example, the device may be placed in a learning mode during which time a user sends a transmission from the trainable transceiver 102 (e.g., by providing an input causing the transmission). The device may receive the transmission and perform a function in response. For example, the device may send an acknowledgement transmission in response to receiving the transmission, send a transmission including a ready indication (e.g., that the device is synchronized with the trainable transceiver 102, encryption information has been exchanged, communication has been acknowledged on all channels used by the device, etc.), store an identifier of the trainable transceiver 102, and/or perform other functions. This process may constitute a pairing of the trainable transceiver 102 and the remote device 112, or other device. For systems using a rolling code, the trainable transceiver 102 and device may be synchronized so that the counters of the trainable transceiver 102 and the device begin with the same rolling code value.

The control circuit 202 of the trainable transceiver 102 may include one or more modules and other data in memory 304 for carrying out and/or facilitating the operations and functionalities of the trainable transceiver 102 described herein. In some embodiments, the memory 304 of the trainable transceiver 102 may include a training module 308, an input authenticator module 310, a lock/unlock sequence 312, a sensor validator module 314, and validation data 316, among others. The modules of the control circuit 202 may be executed or otherwise handled or implemented using a processor 302. The processor 302 may be a general or application specific processor or circuit for performing calculations, handling inputs, generating outputs, and/or otherwise performing computational tasks. In some embodiments, the modules (e.g., the training module 308, the input authenticator module 310, and the sensor validator module 314, etc.) may each be a general or application specific processor or circuit for performing the instructions specified therein.

The user interface 210 may include the one or more buttons 204A-204N and the display 206. In some embodiments, each button 204A-204N may be a physical mechanical button (e.g., a push-button, a physical switch, etc.). In some embodiments, each button 204A-204N may be a touch-sensitive button on an electronic display (e.g., the screen on the vehicle center stack 106 or on the mirror assembly housing of the trainable transceiver 102). Pressing or interacting with button 204A-204N may trigger the control circuit 202 to execute or otherwise process a corresponding functionality (e.g., send a command signal to actuate a function on the remote device 112). The user interface element 210 may indicate via an indicator a status of the trainable transceiver 102 (e.g., success or failure to perform the requested operation). In some embodiments, the indicator may be a light source, such as an incandescent light bulb, a laser-emitting diode, or an ASCII display, among others. In some embodiments, the indicator may be an electroacoustic transducer, such as a loudspeaker, a buzzer, or a siren, among others. In some embodiments, the indicator may be a graphical user interface element rendered and displayed on an electronic display. In some embodiments, the user interface 210 may be situated with the other components and/or modules of the trainable transceiver 102. In some embodiments, the user interface 210 may be situated away from the other components and/or modules of the trainable transceiver 102 (e.g., at the vehicle center stack 106, the visor, the instrument panel, or other control unit within vehicle 100).

The training module 308 may include instructions, programs, executable code, and/or other information used by the control circuit 202 to perform training functions. The training module 308 may learn control information (or training information) from the original transmitter 216 to control a function of the remote device 112. In some embodiments, the training module 308 may enter training mode to learn the control information or the training information, upon pressing of one of the buttons 204A-204N on the user interface element 210. The training module 308 may analyze the received control signal using one or more algorithms, look up tables, and/or other information structures/techniques. The training module 308 may also store one or more characteristics of the control signal received from the original transmitter 216 in memory 304. Using the control signal(s) received from the original transmitter 216, the training module 308 may also train the trainable transceiver 102 to control one or more functions of the remote device 112 using any number of techniques. In some embodiments, the training module 308 may analyze or parse the control signal from the original transmitter 216. Based on the analysis or the parsing of the control signal, the training module 308 may store the control information in memory 304. In some embodiments, the training module 308 may identify a code type (e.g., rolling code or fixed code) of the control signal based on message characteristics (e.g., bit sequence) of the control signal. If the training module 308 determines that the code type of the control signal is rolling code, the training module 308 may initiate and maintain a counter to keep track of the rolling code count. The training module 308 may cause an indicator on the user interface element 210 to indicate (e.g., using an audio and/or visual signal directed to the user) the outcome (e.g., success or failure) of the training of the trainable transceiver 102. The training module 308 may repeat this functionality over multiple messages and/or signals.

To initiate the first step of the two-factor authentication to enable or disable the operations of the trainable transceiver 102, the input authenticator module 310 executed on the processor 302 may determine whether a sequence of inputs 218 on the one or more buttons 204A-204N matches the lock/unlock sequence 312. The lock/unlock sequence 312 may specify an order of the buttons 204A-204N to press to complete the first step of the two-factor authentication. For example, the lock/unlock sequence 312 may specify that the first button 204A is to be pressed, then the third button 204C, then the first button 204A, and finally the second button 204B to complete the first step of the two-factor authentication. In some embodiments, a subset of the buttons 204A-204N may be designated for the lock/unlock sequence 312. In some embodiments, the lock/unlock sequence 312 may specify one order of buttons 204A-204N to press to enable the operations of the trainable transceiver 102 and a different order of buttons 204A-204N to press to disable the operations of the trainable transceiver 102. The lock/unlock sequence 312 may be stored as a data structure (e.g., array, linked list, matrix, etc.) on the memory 304. In some embodiments, responsive to pressing of one of the buttons 204A-204N, the input authenticator module 310 may identify an operation mode of the trainable transceiver 102. The operation mode may be either enabled or disabled. If the operation mode is enabled, the input authenticator module 310 may compare the sequence of inputs 218 to the lock sequence for disabling the trainable transceiver 102. If the operation mode is disabled, the input authenticator module 310 may compare the sequence of inputs 218 to the unlock sequence for enabling the trainable transceiver 102. In this manner, the input authenticator module 310 may use preexisting buttons 204A-204N on the trainable transceiver 102 to perform first step of the two-factor authentication to enable or disable the operations of the trainable transceiver 102.

The input authenticator module 310 may detect a press on one of the one or more buttons 204A-204N. In some embodiments, with each pressing of the button 204A-204N detected, the input authenticator module 310 may identify which button 204A-204N is pressed. The input authenticator module 310 may compare whether the button 204A-204N identified as pressed with a button in the lock/unlock sequence 312. In some embodiments, the input authenticator module 310 may maintain a pointer or a counter on the memory 304. Upon each press of the one or more buttons 204A-204N, the input authenticator module 310 may update the pointer or increment the counter. Using the pointer or the counter, the input authenticator module 310 may keep track of which specified button within the lock/unlock sequence 312 the button pressed is to be compared with the button 204A-204N identified as pressed. With each press of the button 204A-204N matching the button specified by the lock/unlock sequence 312, the input authenticator module 310 may update the pointer or increment the counter to the next button specified by the lock/unlock sequence 312.

In some embodiments, the input authenticator module 310 may determine whether two consecutive presses on the button(s) 204A-204N are within a predefined time window in comparing the sequence of inputs 218 to the lock/unlock sequence 312. The input authenticator module 310 may maintain a timer on memory 304 to keep track of a time of each press on the button(s) 204A-204N. In some embodiments, upon detecting a press on one of the buttons 204A-204N, the timer maintained by the input authenticator module 310 may store a time of the detected press of the button 204A-204N and which button 204A-204N is identified as pressed. With the timer, the input authenticator module 310 may identify a time of a current press on the button(s) 204A-204N. The input authenticator module 310 may also identify a time of a previous press on the button(s) 204A-204N. The input authenticator module 310 may then determine a time elapsed between the time of the current press and the time of the previous press. The input authenticator module 310 may compare the time elapsed to the predefined time window. If the time elapsed between the two consecutive presses is less than the predefined time window, the input authenticator module 310 may compare the button 204A-204N identified as pressed with the specified button within the lock/unlock sequence 312 identified by the pointer or counter. If the time elapsed between the two consecutive presses is greater than or equal to the predefined time window, the input authenticator module 310 may refresh the pointer or set the counter to null. The input authenticator module 310 may also compare the button 204A-204N identified as pressed with an initial button specified by the lock/unlock sequence 312. In this manner, the input authenticator module 310 may force the user of the trainable transceiver 102 to input an entirety of the sequence of inputs 218 within a set amount of time, thereby preventing accidental disabling or enabling of the trainable transceiver 102.

If the button 204A-204N pressed does not match the button specified by the lock/unlock sequence 312, the input authenticator module 310 may identify the operation mode of the trainable transceiver 102. If the operation mode is identified as enabled, the input authenticator module 310 may permit the control circuit 202 to execute the operation corresponding to the button 204A-204N identified as pressed. If the operation mode is identified as disabled, the control circuit 202 may be prevented by the locking mechanism 214 from performing the operation corresponding to the button 204A-204N identified as pressed, as will be detailed herein below. In addition, the input authenticator module 310 may reset the pointer and the counter for keeping track of which button specified by the lock/unlock sequence 312 is to be compared with the button 204A-204N identified as pressed.

If the button 204A-204N pressed matches the button specified by the lock/unlock sequence 312, the input authenticator module 310 may determine whether the button specified by the lock/unlock sequence 312 is the last button specified. In some embodiments, the input authenticator module 310 may compare the counter to a length of the lock/unlock sequence 312 to determine whether the button specified is the last button. In some embodiments, the input authenticator module 310 may determine that the pointer references the last element of the lock/unlock sequence 312 to determine whether the button specified is the last button. If the button specified by the lock/unlock sequence 312 is not the last button specified, the input authenticator module 310 may identify the next button specified by the lock/unlock sequence 312. The input authenticator module 310 may also update the pointer or increment the counter. If the button specified by the lock/unlock sequence 312 is the last button specified, the input authenticator module 310 may invoke the sensor validator module 314 to perform the second step of the two-factor authentication, as detailed herein below. In some embodiments, input authenticator module 310 may trigger the locking mechanism 214 to enable or disable the operations of the trainable transceiver 102.

As part of the second step of the two-factor authentication, the sensor validator module 314 executed on the processor 302 may acquire data 220 from the sensor 208. In some embodiments, responsive to the sequence of inputs 218 on the one or more buttons 204A-204N matching the lock/unlock sequence 312, the sensor validator module 314 may acquire the data 220 from the sensor 208. In some embodiments, responsive to the sequence of inputs 218 matching the lock/unlock sequence 312, the sensor validator module 314 may trigger the user interface element 210 to prompt (e.g., via the display 206 or an indicator) the user that the sensor 208 is acquiring data 220. The acquired data 220 may be from multiple sensors 208 (e.g., a camera in visible spectrum, a camera in infrared spectrum, a fingerprint reader, a radiofrequency (RF) sensor, etc.). In some embodiments, the sensor 208 may include a camera pointed at a user of the trainable transceiver 102 (e.g., at a face of the user, an eye of the user, a finger of the user, etc.). In some embodiments, the sensor 208 may include a fingerprint sensor to obtain a fingerprint of the user of the trainable transceiver 102. In some embodiments, the sensor 208 may include an RF sensor to obtain an RF signal from a token generator (e.g., from a key fob, smart-card, laptop, smartphone, or other mobile device associated with the user of the trainable transceiver 102). In some embodiments, the token generator may include a radiofrequency identification (RFID) element used to detect the RF signal by the sensor 208. In some embodiments, the token generator may transmit the RF signal to the sensor 208 upon request (e.g., pressing of a button) by the user of the token generator.

Having acquired the data 220 from the sensor 208, the sensor validator module 314 may identify a datatype of the acquired data 220. The datatype of the acquired data 220 may correspond to a type of sensor 208 used (e.g., the camera, fingerprint reader, RF sensor, etc.). The datatype of the acquired data 220 may include an image, a capacitance reading, or an RF signal, among others. In some embodiments, the sensor validator module 314 may store the acquired data 220 onto the memory 304. In some embodiments, the sensor validator module 314 may also store the acquired data 220 with the identified datatype for the acquired data 220 on the memory 304. In some embodiments, the acquired data 220 and the identified datatype may be stored temporarily and may be deleted after the elapsing of a predefined time window.

The sensor validator module 314 may determine whether validation data 316 is stored on the memory 304. The validation data 316 may correspond to a same type of data as the acquired data 220 and may be used by the sensor validator module 314 as part of the second step in the two-factor authentication. The sensor validator module 314 may determine whether the acquired data 220 is the first time the sensor 208 acquired the data 220 from the user of the trainable transceiver 102. In some embodiments, the sensor validator module 314 may determine whether the acquired data 220 is the first time for the identified datatype. In some embodiments, the sensor validator module 314 may maintain a counter, timer, or pointer to keep track of a number of times or instances the sensor 208 acquired the data 220. If the acquired data 220 is for the first time, the sensor validator module 314 may set the acquired data 220 as the validation data 316. Moreover, if the acquired data 220 is for the first time for the identified datatype, the sensor validator module 314 may set the acquired data 220 for the identified datatype as the validation data 316. In addition, the sensor validator module 314, in conjunction with the input authenticator module 310, may proceed to trigger the locking mechanism 214 to enable or disable the operations of the trainable transceiver 102.

Otherwise, if the acquired data 220 is not for the first time, the sensor validator module 314 may determine that the validation data 316 is already stored on the memory 304. Further, if the acquired data 220 is not for the first time for the identified datatype, the sensor validator module 314 may determine that the validation data 316 for the identified datatype is already stored on the memory 304. If the validation data 316 is determined to be already stored on the memory 304, the sensor validator module 314 may compare the acquired data 220 to validation data 316. In some embodiments, the sensor validator module 314 may identify the datatype of the validation data 316 and the datatype of the acquired data 220. If the datatype of the validation data 316 matches the datatype of the acquired data 220, the sensor validator module 314 may proceed to compare feature space of the acquired data 220 to feature space of the validation data 316.

To determine the feature space of the acquired data 220 with the feature space of the validation data 316, the sensor validator module 314 may use image recognition algorithms (e.g., object recognition or blob recognition) on the validation data 316 and the acquired data 220. The sensor validator module 314 may also use biometric detection algorithms (e.g. facial recognition or iris recognition algorithms) on the validation data 316 and the acquired data 220. The sensor validator module 314 may also use signal processing techniques (e.g., principal component analysis, linear discriminant analysis, multilinear subspace learning, neural networks, or other pattern recognition techniques) on both the validation data 316 and the acquired data 220.

With the feature spaces of both the acquired data 220 and the validation data 316 determined, the sensor validator module 314 may determine whether the acquired data 220 from the sensor 208 is substantially similar to the validation data 316. The sensor validator module 314 may calculate a difference between the feature space of the acquired data 220 and the feature space of the validation data 316. The difference may indicate a measure of discrepancy or distance between the acquired data 220 from the validation data 316. The sensor validator module 314 may determine whether the difference is less than a predetermined threshold. The predetermined threshold may be set so that the feature space of the acquired data 220 should be 75%-100% similar to the feature space of the validation data 316. If the difference is determined to be less than the predetermined threshold, the sensor validator module 314 may determine that the acquired data 220 is substantially similar to the validation data 316. The sensor validator module 314 may also authenticate the user of the trainable transceiver 102 as part of the two-factor authentication. The sensor validator module 314 may further display an indication of success in authentication on the user interface element 210 (e.g., using the display 206 or an indicator). If the difference is determined to be greater than or equal to the predetermined threshold, the sensor validator module 314 may determine that the acquired data 220 is not substantially similar to the validation data 316. Furthermore, the sensor validator module 314 may reject authentication of the user of the trainable transceiver 102. The sensor validator module 314 may also display an indication of failure in authentication on the user interface element 210 (e.g., using the display 206 or an indicator).

Once the multi-factor authentication is complete, the input validator module 310 and/or the sensor validator module 314 may identify the operation mode of the trainable transceiver 102. If the operation mode is set to enabled, the input validator module 310 and/or the sensor validator module 314 may set the operation mode to disabled. The input validator module 310 and/or the sensor validator module 314 may also trigger the locking mechanism 214 to disable the operations of the trainable transceiver 102. If the operation mode is set to disabled, the input validator module 310 and/or the sensor validator module 314 may set the operation mode to enabled. The input validator module 310 and/or the sensor validator module 314 may also trigger the locking mechanism to enable the operations of the trainable transceiver 102.

Upon a trigger command from the input authenticator module 310 and/or the sensor validator module 314, the locking mechanism 214 may enable or disable the operations of the trainable transceiver 102. In some embodiments, the locking mechanism 214 may be a module on the memory 304 executable by the processor 302. In some embodiments, the locking mechanism 214 may be a separate electronic component (e.g., a multiplexer) of the control circuit 202. In some embodiments, the locking mechanism 214 may be a separate electronic component coupled to the control circuit 202. In some embodiments, the locking mechanism 214 may include a mechanical switch coupled to one or more components of the trainable transceiver 102. In some embodiments, the locking mechanism 214 may be controlled by the input authenticator module 310 and/or the sensor validator module 314.

In some embodiments, the locking mechanism 214 may set the operation mode to enabled or disabled based on the trigger from the input authenticator module 310 and/or the sensor validator module 314. With the operation mode of the trainable transceiver 102 set to disabled, the locking mechanism 214 may restrict at least a subset of the functionalities of the trainable transceiver 102. In some embodiments, the locking mechanism 214 may disable transmissions of control signals from the trainable transceiver 102 via the transceiver circuit 306 to the remote device 112. In some embodiments, while the functionality of the trainable transceiver 102 is disabled, the locking mechanism 214 may disconnect power from the power source 212 to the transceiver circuit 306 (e.g., using a multiplexer or the mechanical switch coupled to the power source 212 and the transceiver circuit 306). In some embodiments, with the functionality of the trainable transceiver 102 is disabled, the locking mechanism 214 may delete or erase the training information determined by the training module 308 from the memory 304. In some embodiments, while the operation of the trainable transceiver 102 is set to disabled, the locking mechanism 214 may disable the training module 308 from entering training mode to learn the control information for controlling one or more functions of the remote device 112. In some embodiments, responsive to the operation mode of the trainable transceiver 102 set to disabled, the locking mechanism 214 may cause the user interface element 210 to indicate the operation mode of the trainable transceiver 102 as disabled (e.g., via the display 206 or an indicator). By disabling the trainable transceiver 102, the locking mechanism 214 may prevent a malicious individual (either with direct, physical access or remote access to the trainable transceiver 102) from activating the functionalities of the trainable transceiver 102. In this manner, the locking mechanism 214 may restrict such individuals from activating the one or more functions of the remote device 112 in an unsolicited or mischievous fashion.

With the operation mode of the trainable transceiver 102 set to enabled, the locking mechanism 214 may permit all the functionality of the trainable transceiver 102. In some embodiments, the locking mechanism 214 may permit transmissions of control signals from the trainable transceiver 102 via the transceiver circuit 306 to the remote device 112. In some embodiments, while the functionality of the trainable transceiver 102 is enabled, the locking mechanism 214 may maintain or connect power from the power source 212 to the transceiver circuit 306 (e.g., using a multiplexer or the mechanical switch coupled to the power source 212 and the transceiver circuit 306). In some embodiments, with the functionality of the trainable transceiver 102 enabled, the locking mechanism 214 may maintain the training information determined by the training module 308 from the memory 304. In some embodiments, while the operation of the trainable transceiver 102 is set to enabled, the locking mechanism 214 may enable the training module 308 to enter training mode to learn the control information for controlling one or more functions of the remote device 112. In some embodiments, responsive to the operation mode of the trainable transceiver 102 set to enabled, the locking mechanism 214 may cause the user interface element 210 to indicate the operation mode of the trainable transceiver 102 as enabled (e.g., using the display 206 or an indicator). By enabling the trainable transceiver 102, the locking mechanism 214 may allow the rightful user of the trainable transceiver 102 to regain access and to activate the functionalities of the trainable transceiver 102. Moreover, the locking mechanism 214 may assist such users to use the trainable transceiver 102 in controlling access in activating the one or more functions of the remote device 112.

Figure 4:
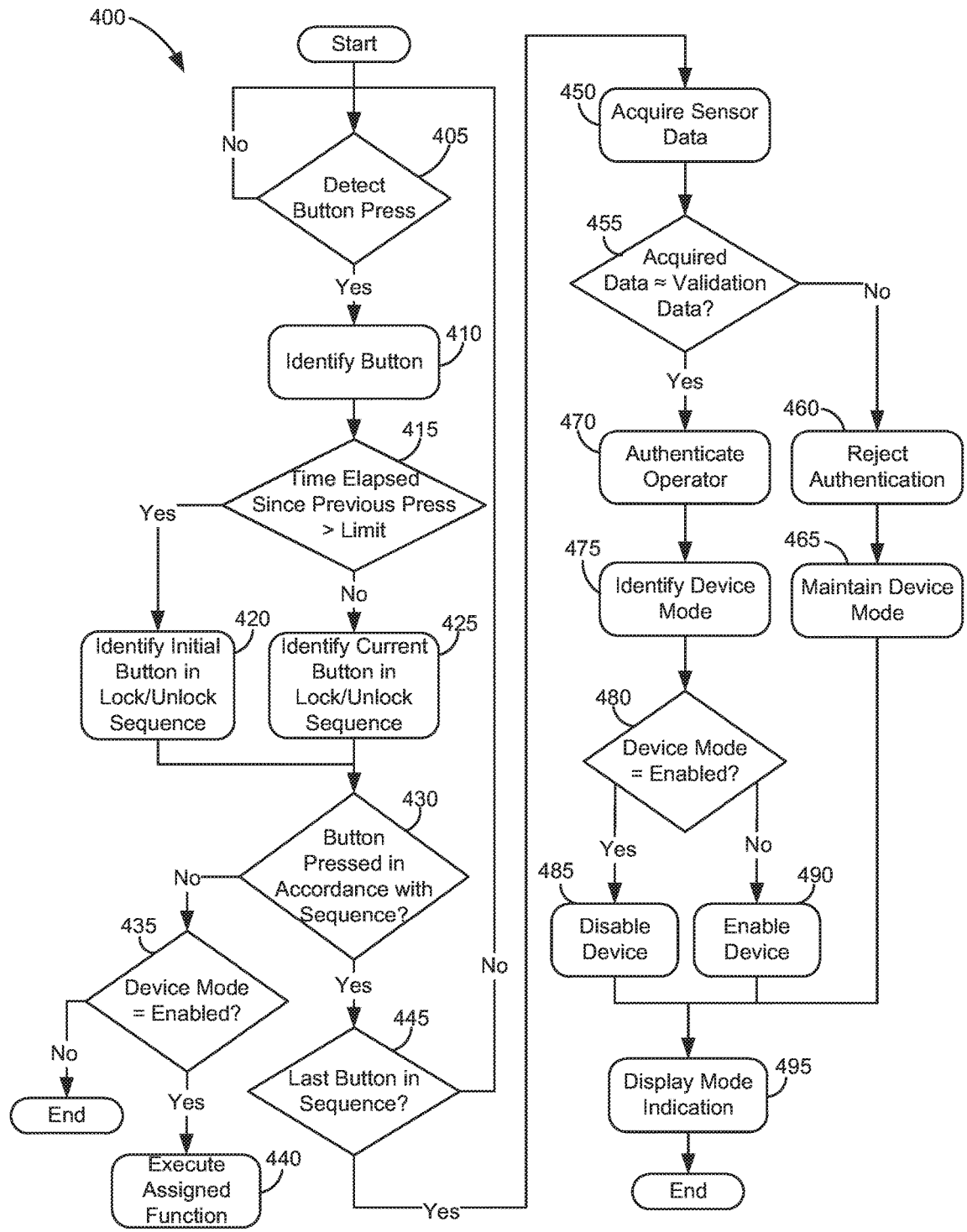
FIG. 4 is a flow diagram of a method of enabling or disabling the functionalities of the trainable transceiver.

Now referring to FIG. 4, a method 400 of enabling or disabling the operations of a trainable transceiver is shown. The method 400 may be performed using various components and/or modules detailed herein, such as the trainable transceiver 102, as described in conjunction with FIGS. 2 and 3. In brief overview, steps 405-445 may correspond to a first step in a two-factor authentication process and steps 450-495 may correspond to a second step in the two-factor authentication process.

In further detail, at step 405, a trainable transceiver may detect a button press. Each button on the trainable transceiver may be a physical mechanical button, a touch-sensitive button, or a combination thereof. The pressing of the button may trigger the trainable transceiver to perform a particular function. The trainable transceiver may repeat the functionality of step 405, until a button press is detected. At step 410, once the button press is detected, the trainable transceiver may identify the button pressed. The trainable transceiver at this point may at this point initiate a first step in the two-factor authentication process by comparing the buttons pressed to a lock/unlock sequence. The lock/unlock sequence may include a set, defined sequence of buttons to enable or disable the trainable transceiver. In some embodiments, there may be a sequence of buttons to press to enable the trainable transceiver and another sequence of buttons to disable the trainable transceiver.

At step 415, the trainable transceiver may determine whether a time elapsed since the previous button press is greater than a time limit. The time limit may restrict an amount of time that the user of the trainable transceiver is to input the defined sequence of buttons to enable or disable the trainable transceiver. The time limit may also prevent the user from accidentally or unintentionally enabling, disabling, or otherwise toggling the mode of the trainable transceiver. At step 420, if the time elapsed is greater than the time limit, the trainable transceiver may identify an initial button specified in the lock/unlock sequence. In this manner, the button checked against in the lock/unlock sequence may return to the beginning of the lock/unlock sequence. At step 425, if the time elapsed is less than or equal to the time limit, the trainable transceiver may identify a current button in the lock/unlock sequence. In this fashion, the button checked against in the lock/unlock sequence may continue onto the next in the lock/unlock sequence. At step 430, the trainable transceiver may determine whether the button pressed is in accordance with the lock/unlock sequence.

At step 435, if the button pressed is not in accordance with the lock/unlock sequence, the trainable transceiver may determine whether a device mode is enabled. At step 440, if the device mode is enabled, the trainable transceiver may execute the assigned function. At this moment, the trainable transceiver may resume the normal functionality corresponding to the button identified as pressed. Otherwise, if the device mode is disabled, the trainable transceiver may not perform any function. In this manner, by disabling the trainable transceiver, malicious users may be prevented from accessing the functionalities of the trainable transceiver to activate a remote device. At step 445, if the button pressed is in accordance with the lock/unlock sequence, the trainable transceiver may determine whether the button pressed is the last button in the lock/unlock sequence. If the button pressed is not the last button in the lock/unlock sequence, the trainable transceiver may repeat the functionalities of steps 405-440.

At step 450, if the button pressed is the last button in the lock/unlock sequence, the trainable transceiver may acquire sensor data. The trainable transceiver may also determine that the first step of the two-factor authentication is complete. From this instance, the trainable transceiver may also initiate the second and final step of the two-factor authentication. The sensor data may be from at least one of a camera, a fingerprint reader, and a radiofrequency (RF) sensor, among others. At step 455, the trainable transceiver may determine whether the acquired data substantially matches validation data. The validation data may correspond to a same datatype as the data acquired from the sensor. To determine whether the acquired data substantially matches the validation data, the trainable transceiver may use image recognition algorithms, biometric recognition algorithms, and other signal processing techniques, among others. In some embodiments, if the sensor is acquiring data for the first time, the trainable transceiver may set the acquired data as the validation data.

At step 460, if the acquired data does not substantially match the validation, the trainable transceiver may reject authentication. At step 465, the trainable transceiver may maintain the device mode. In this manner, the trainable transceiver may prevent a user other than the rightful user (e.g., a malicious user) from gaining access to the trainable transceiver. At step 470, on the other hand, if the acquired data substantially matches the validation data, the trainable transceiver may authenticate the operator the trainable transceiver. With the data acquired from the sensor substantially matching the validation data and the buttons pressed matching the lock/unlock sequence, the trainable transceiver may complete the second and final step of the two-factor authentication. From this point, the user of the trainable transceiver may be permitted to toggle the device mode of the trainable transceiver from enabled to disabled or vice-versa.

At step 475, the trainable transceiver may identify the device mode. At step 480, the trainable transceiver may determine whether the device mode is enabled or disabled. At step 485, if the device mode is enabled, the trainable transceiver may disable the operations of the trainable transceiver. With the operations of the trainable transceiver disabled, the trainable transceiver may be prevented from sending signals among other functions. In some embodiments, the training or control information for controlling another remote device may be erased from the memory of the trainable transceiver. At step 490, if the device mode is disabled, the trainable transceiver may enable the operations of the trainable transceiver. With the operations of the trainable transceiver enabled, the trainable transceiver may be permitted to send signals among other functions. In some embodiments, the trainable transceiver may be permitted to enter training mode to re-learn the control or training information for controlling another remote device. At step 495, the trainable transceiver may display an indication of the device mode of the trainable transceiver.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Two or more steps may be performed concurrently or with partial concurrence. Such variation will depend on the software and hardware systems chosen and on the designer's choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A trainable transceiver for controlling remote devices, comprising:
    a control circuit;
    a plurality of buttons configured to cause the control circuit to control one or more functions of a remote device;
    an input authenticator module executed on the control circuit, configured to compare a sequence of inputs on the plurality of buttons to a predetermined sequence; and
    a locking mechanism configured to enable or disable operation of the control circuit to control the one or more functions of the remote device, in response to the comparison by the input authenticator and a determination that the sequence of inputs on the plurality of buttons matches the predetermined sequence.

2. The trainable transceiver of claim 1, further comprising:
    a sensor validator module executed on the control circuit, configured to identify a sensor reading acquired by a sensor and to compare the sensor reading to a predetermined data; and wherein the locking mechanism is further configured to enable or disable the operation of the control circuit, responsive to a determination that the sensor reading substantially matches the predetermined data and to the determination the sequence of inputs on the plurality of buttons matches the predetermined sequence.

3. The trainable transceiver of claim 2, wherein the sensor validator module is configured to use at least one of an image recognition algorithm on an image captured at the sensor or a signal comparison algorithm on a radiofrequency signal taken at the sensor.

4. The trainable transceiver of claim 1, wherein the input authenticator module is configured to:
   determine that a time elapsed between a first time for a first input of the sequence of inputs and a second time of a second input of the sequence of inputs is within a predefined time window; and
   compare, in responsive to the determination that the time elapsed between the first time and the second time is within the predefined time window, the second input of the sequence of inputs to a specified input in the predetermined sequence.

5. The trainable transceiver of claim 1, wherein the input authenticator module is configured to compare the sequence of inputs on the plurality of buttons and determine whether it matches one of a lock sequence or an unlock sequence.

6. The trainable transceiver of claim 1, wherein the locking mechanism is configured to preserve or erase training information from memory of the control circuit to control the one or more functions of the remote device based on the determination that the sequence of inputs on the plurality of buttons matches the predetermined sequence.

7. The trainable transceiver of claim 1, wherein the locking mechanism includes a mechanical switch configured to enable or disable the operation of a transceiver of the control circuit for transmitting control signals to control the one or more functions of the remote device based on the determination that the sequence of inputs on the plurality of buttons matches the predetermined sequence.

8. A system for controlling remote devices, comprising:
   a control circuit;
   a plurality of buttons configured to receive a plurality of inputs and to cause the control circuit of a trainable transceiver to control one or more functions of a remote device using training information;
   a sensor coupled to the control circuit configured to acquire sensor data and to relay the sensor data to the control circuit; and
   a locking mechanism of the trainable transceiver configured to enable or disable operation of the control circuit in response to the plurality of inputs matching a predetermined sequence and the acquired sensor data substantially matching predetermined data.

9. The system of claim 8, wherein the sensor is further configured to acquire the sensor data in response to the plurality of inputs at the plurality of buttons matching the predetermined sequence.

10. The system of claim 8, wherein the locking mechanism is further configured to cause a user interface element to display a status of the trainable transceiver in response to the plurality of inputs matching the predetermined sequence and the acquired sensor data substantially matching predetermined data.

11. The system of claim 8, wherein the locking mechanism is further configured to enable or disable the operation of the control circuit in response to the plurality of inputs on a subset of the plurality of buttons matching the predetermined sequence.

12. The system of claim 8, wherein the locking mechanism is further configured to maintain or delete the training information from the control circuit in response to the plurality of inputs matching the predetermined sequence and the acquired sensor data substantially matching the predetermined data.

13. The system of claim 8, wherein the locking mechanism is further configured to connect a power source to a transceiver circuit of the control circuit to enable transmission of a control signal to the remote device or to disconnect the power source from the transceiver of the control circuit to disable the transmission of the control signal to the remote device, responsive to the plurality of inputs matching the predetermined sequence and the acquired sensor data substantially matching the predetermined data.

14. A method for controlling remote devices, comprising:
   receiving, by a trainable transceiver, a sequence of inputs on a plurality of buttons;
   comparing, by the trainable transceiver, the sequence of inputs received from the plurality of buttons to a predetermined sequence; and
   setting, by the trainable transceiver, responsive to determining that the sequence of inputs on the plurality of buttons matches the predetermined sequence, an operation mode of the trainable transceiver to enabled or disabled for controlling one or more functions of a remote device.

15. The method of claim 14, further comprising:
   acquiring, by the trainable transceiver, via a sensor, a sensor reading; and
   comparing, by the trainable transceiver, the sensor reading to predetermined data; and
   wherein setting the operation mode of the trainable transceiver further comprises setting the operation mode to enabled or disabled, responsive to determining that the sensor reading substantially matches the predetermined data.

16. The method of claim 14, further comprising:
   identifying, by the trainable transceiver, responsive to receiving an input of the sequence of inputs, the operation mode of the trainable transceiver;
   comparing, by the trainable transceiver, the sequence of inputs on the plurality of buttons to one of a lock sequence or an unlock sequence based on identifying the operation mode of the trainable transceiver.

17. The method of claim 14, further comprising:
   determining, by the trainable transceiver, that a time elapsed between a first time for a first input of the sequence of inputs and a second time of a second input of the sequence of inputs is within a predefined time window; and
   comparing, by the trainable transceiver, responsive to determining that the time elapsed between the first time and the second time is within the predefined time window, the second input of the sequence of inputs to a specified input in the predetermined sequence.

18. The method of claim 14, further comprising:
   displaying, by the trainable transceiver, on a user interface element, the operation mode of the trainable transceiver, responsive to setting the operation mode to enabled or disabled.

19. The method of claim 14, wherein setting the operation mode further comprises:

erasing, responsive to determining that the sequence of inputs on the plurality of buttons matches the predetermined sequence, training information from memory of the trainable transceiver for controlling the one or more functions of the remote device.

20. The method of claim 14, wherein setting the operation mode further comprises:

setting, using a mechanical switch connected to a power supply coupled to the trainable transceiver, the operation mode of the trainable transceiver.

\* \* \* \* \*